US012650579B2

(12) United States Patent (10) Patent No.: US 12,650,579 B2
Zhuang et al. (45) Date of Patent: Jun. 9, 2026

(54) METHOD TO DESIGN ULTRA-WIDE ANGLE MINIATURE LENS

(71) Applicant: ImmerVision, Inc., Montreal (CA)

(72) Inventors: Zhenfeng Zhuang, Montreal (CA); Jocelyn Parent, Lavaltrie (CA); Xavier Dallaire, Verdun (CA); Simon Thibault, Quebec City (CA); Patrice Roulet, Montreal (CA)

(73) Assignee: IMMERVISION, INC., Montreal (CA)

( * ) Notice: Subject to any disclaimer, the term of this patent is extended or adjusted under 35 U.S.C. 154(b) by 735 days.

(21) Appl. No.: 17/901,186

(22) Filed: Sep. 1, 2022

(65) Prior Publication Data

US 2023/0078816 A1      Mar. 16, 2023

Related U.S. Application Data

(60) Provisional application No. 63/240,495, filed on Sep. 3, 2021.

(51) Int. Cl.
G02B 13/00       (2006.01)
G02B 13/06       (2006.01)
G02B 27/00       (2006.01)
H04N 23/55       (2023.01)

(52) U.S. Cl.
CPC ......... G02B 13/0045 (2013.01); G02B 13/06 (2013.01); G02B 27/0012 (2013.01); H04N 23/55 (2023.01)

(58) Field of Classification Search
CPC ...... G02B 13/06; G02B 13/0045; G02B 9/62; G02B 9/64
See application file for complete search history.

(56) References Cited

U.S. PATENT DOCUMENTS

| | | |
|---|---|---|
| 6,844,990 B2 | 1/2005 | Artonne et al. |
| 6,865,028 B2 | 3/2005 | Moustier et al. |
| 9,983,663 B2 | 5/2018 | Zhou et al. |
| (Continued) | | |

FOREIGN PATENT DOCUMENTS

| | | | |
|---|---|---|---|
| CN | 111208089 A | 5/2020 | |
| CN | 111427133 A * | 7/2020 | ......... G02B 13/0045 |
| (Continued) | | | |

OTHER PUBLICATIONS

International Search Report and Written Opinion issued Nov. 9, 2022 in International Application No. PCT/IB2022/057770.

(Continued)

*Primary Examiner* — Alexander P Gross
(74) *Attorney, Agent, or Firm* — Panitch Schwarze Belisario & Nadel LLP

(57)          ABSTRACT

Miniature optical lenses are disclosed having a ratio of the optical image diameter divided by the total track length that is greater than 0.85. These thin optical lenses are often used in applications requiring large image sensors and small thickness like in consumer electronic applications. The miniature optical lenses presented have fields of view between 130° and 170° or more specifically inside the well-desired 140° to 160° field of view range in order to cover the ultra-wide-angle field of view range. The optical lenses presented also respect some dimensionless ratios in order to maximize the optical performance of the lenses.

19 Claims, 5 Drawing Sheets

(56)                    References Cited

U.S. PATENT DOCUMENTS

| | | |
|---|---|---|
| 10,302,917 B2 | 5/2019 | Jung et al. |
| 10,921,558 B2 | 2/2021 | Yao |
| 10,935,766 B2 | 3/2021 | Hsu et al. |
| 2010/0303373 A1* | 12/2010 | Keelan ...................... G06T 5/73 |
| | | 382/255 |
| 2017/0269342 A1* | 9/2017 | Jung ...................... G02B 13/06 |
| 2018/0348480 A1* | 12/2018 | Sekine ................... G02B 13/04 |
| 2021/0014417 A1 | 1/2021 | Roulet et al. |
| 2021/0132338 A1 | 5/2021 | Lin et al. |

FOREIGN PATENT DOCUMENTS

| | | |
|---|---|---|
| EP | 3608717 A1 | 2/2020 |
| WO | 0168540 A2 | 9/2001 |

OTHER PUBLICATIONS

International Search Report and Written Opinion issued Dec. 21, 2022 in International Application No. PCT/IB2022/058235.
Extended European Search Report issued on Jun. 17, 2025 in EP Application No. 22863765.8.

* cited by examiner

METHOD TO DESIGN ULTRA-WIDE ANGLE MINIATURE LENS

CROSS-REFERENCE TO RELATED APPLICATIONS

This application claims the benefit of U.S. Provisional Patent Application No. 63/240,495, filed Sep. 3, 2021, entitled "Method to Design Ultra-Wide Angle Miniature Lenses," the entire contents of which are incorporated by reference herein.

BACKGROUND OF THE INVENTION

Embodiments of the present invention relate to the field of optical lenses and their design and, more particularly, to a miniature optical lens having a total field of view generally between 130° and 170°, and more specifically between 140° to 160°.

Miniature optical lenses, in which the ratio of the optical image diameter divided by the total track length is greater than 0.85, are required for applications in which space is limited to fit the optical system and large optical images are also required in order to fill the corresponding image sensors. For example, these miniature optical lenses are widely present in consumer electronic applications, including mobile phones, tablets, laptop computers or the like, since the smallest thickness possible is a strong desire from users and the largest optical image possible generally means better image quality, either by using image sensors with more pixels or by using image sensors with larger pixels.

There is a large number of optical lens designs and constructions that have been proposed for miniature optical lenses for consumer electronic applications. However, most of these have total fields of view between 60° and 130° and there is a need to develop miniature optical lenses having fields of view between 130° and 170°. More specifically, the field of view range of 140° to 160° is well desired in order to cover the ultra-wide-angle field of view range that is currently missing in the current generation of consumer electronics devices.

BRIEF SUMMARY OF THE INVENTION

Several embodiments of miniature ultra-wide-angle optical lenses are described herein having ratios of the optical image diameter divided by the total track length greater than 0.85. The optical lens constructions can easily be adapted to have fields of view between 130° and 170° and more specifically, to cover the well-desired field of view range of 140° to 160° in order to cover the ultra-wide-angle field missing in the current generation of consumer electronic devices.

Five specific embodiments of interest are presented, having between six and eight optical elements in them. It is to be understood that some other small variations of these embodiments are possible from a person skilled in the art of optical design in order to slightly modify the optical performances of these designs. When doing so, some values for dimensionless ratios have to be respected in order to maximize the optical performance of the lenses according to the present invention.

Also, some guidelines of specific shapes and optical powers for some optical elements inside these miniature ultra-wide-angle optical lenses are given in order to maximize the optical performance, and more specifically the optical distortion in order to create an ideal image on the optical image plane.

BRIEF DESCRIPTION OF THE SEVERAL VIEWS OF THE DRAWINGS

The foregoing summary, as well as the following detailed description of a preferred embodiment of the invention, will be better understood when read in conjunction with the appended drawings. For the purpose of illustration, there is shown in the drawings an embodiment which is presently preferred. It should be understood, however, that the invention is not limited to the precise arrangements and instrumentalities shown.

In the drawings.

DETAILED DESCRIPTION OF THE INVENTION

The words "a" and "an", as used in the claims and in the corresponding portions of the specification, mean "at least one."

Figure 1:
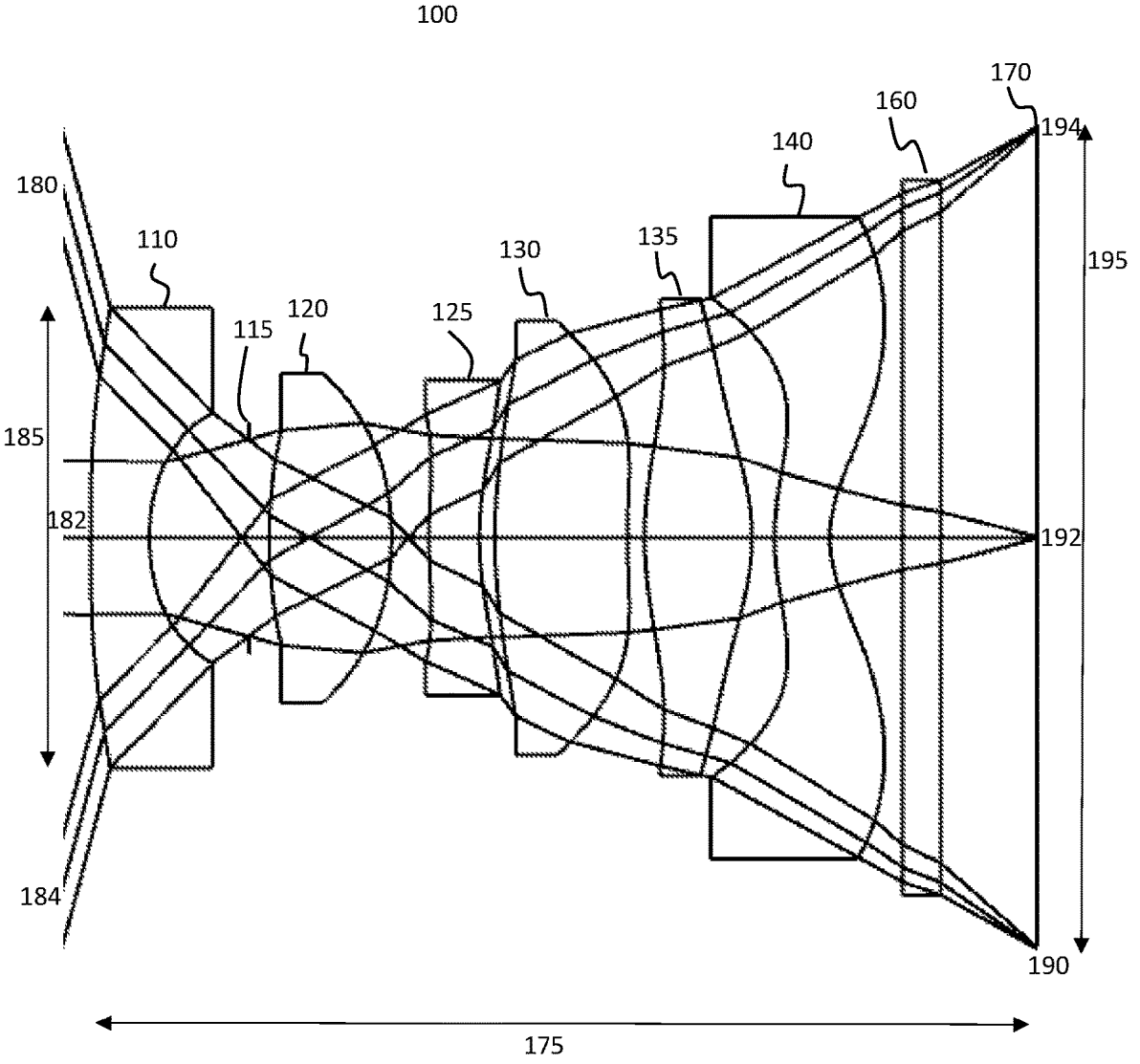
FIG. 1 shows the optical layout of a first embodiment of the miniature ultra-wide-angle lens including six optical elements.

FIG. 1 shows the optical layout of a first embodiment of the miniature ultra-wide-angle lens including six optical elements. In this embodiment, a ray of light travelling from an object to an image plane passes successively through a first optical element 110, an aperture stop 115, a second optical element 120, a third optical element 125, a fourth optical element 130, a fifth optical element 135 and a sixth optical element 140. The light then passes through an optional coverglass and/or filter window(s) 160 before creating an image in an image plane 170. In this example embodiment, the total field of view represented as the angular separation between the incoming rays from the maximum field angle 180 and the incoming rays from the minimum field angle 184 has a value of 150°, but the total field of view could be any value between 130° and 170° according to the present invention, or more specifically between 140° and 160° in other embodiments of the present invention. In this example, the rays 180 coming from the object from an angle of +75° form an image at position 190 in the image plane, the rays 182 coming from the object from an angle of 0° form an image at position 192 in the image plane and the rays 184 coming from the object from an angle of −75° form an image at position 194 in the image plane. On the object side surface of the first optical element 110, there is a clear aperture dimension 185, which is defined as the diameter on the surface limited by the upper rays at the maximum field angle 180 and the lower rays at the minimum field angle 184. The optical lens creates an image having an image diameter 195, defined as the diameter on the image plane limited by the image location 194 for the minimum field angle and the image location 190 for the maximum field angle. The optical lens also has a total track length 175, defined as the distance on the optical axis from the vertex on the object side of the first element 110 to the image plane 170. The full optical prescription for this first embodiment is found in tables 1 and 2. For this prescription, the type XOSPHERE is short for Extended Asphere, a type of surface available in optical design software like Zemax OpticStudio that allows the common aspherical equation for an optical surface to be extended to even polynomial up to order 480, even if polynomial up to the order 20 have been used in the present invention.

TABLE 1

Optical prescription of the first embodiment - Main parameters.

| Sur-face # | Type | Radius | Thick-ness | Index | Abbe | Conic |
|---|---|---|---|---|---|---|
| Object | STANDARD | Infinity | Infinity | | | |
| 1 | XOSPHERE | −23.904 | 0.320 | 1.516 | 57.038 | 99.990 |
| 2 | XOSPHERE | 1.185 | 0.545 | | | −3.501 |
| 3 (stop) | STANDARD | Infinity | 0.116 | | | |
| 4 | XOSPHERE | 2.541 | 0.675 | 1.545 | 55.987 | −25.138 |
| 5 | XOSPHERE | −1.676 | 0.209 | | | 1.778 |
| 6 | XOSPHERE | 3.446 | 0.275 | 1.661 | 20.382 | −47.929 |
| 7 | XOSPHERE | 1.606 | 0.086 | | | −11.388 |
| 8 | XOSPHERE | 2.895 | 0.734 | 1.535 | 55.584 | −1.173 |
| 9 | XOSPHERE | 4.286 | 0.095 | | | 4.592 |
| 10 | XOSPHERE | 2.082 | 0.592 | 1.516 | 57.038 | −13.300 |
| 11 | XOSPHERE | −1.177 | 0.123 | | | −2.519 |
| 12 | XOSPHERE | 1.356 | 0.307 | 1.640 | 23.503 | −9.802 |
| 13 | XOSPHERE | 0.653 | 0.400 | | | −3.002 |
| 14 | STANDARD | Infinity | 0.210 | 1.517 | 64.167 | |
| 15 | STANDARD | Infinity | 0.549 | | | |
| Image | STANDARD | Infinity | 0.000 | | | |

TABLE 2

Optical prescription of the first embodiment - Aspherical coefficients.

| # | p^4 | p^6 | p^8 | p^10 | p^12 | p^14 | p^16 | p^18 | p^20 |
|---|---|---|---|---|---|---|---|---|---|
| 1 | 2.316E−01 | −3.076E−01 | 1.997E−01 | 1.505E−01 | −5.238E−01 | 5.790E−01 | −3.389E−01 | 1.049E−01 | −1.356E−02 |
| 2 | 6.836E−01 | 3.999E−02 | −3.210E+00 | 2.121E+01 | −6.943E+01 | 1.467E+02 | −1.833E+02 | 9.537E+01 | 3.166E+01 |
| 4 | 2.122E−01 | −1.014E+00 | 7.475E+00 | −4.373E+01 | 1.650E+02 | −3.851E+02 | 5.219E+02 | −3.549E+02 | 7.957E+01 |
| 5 | −2.333E−01 | 4.925E−01 | −2.950E−01 | −3.702E+00 | 1.785E+01 | −3.956E+01 | 4.818E+01 | −3.092E+01 | 8.222E+00 |
| 6 | −4.449E−01 | 6.210E−01 | −1.722E+00 | 4.353E+00 | −8.369E+00 | 1.096E+01 | −9.357E+00 | 4.774E+00 | −1.051E+00 |
| 7 | −1.536E−01 | 2.669E−01 | −4.875E−01 | 6.783E−01 | −6.397E−01 | 4.179E−01 | −1.777E−01 | 3.393E−02 | 2.650E−03 |
| 8 | −1.433E−01 | 2.676E−01 | −2.726E−01 | −2.203E−01 | 9.346E−01 | −1.125E+00 | 7.094E−01 | −2.404E−01 | 3.533E−02 |
| 9 | −4.201E−01 | 3.634E−02 | 2.328E−02 | 3.809E−01 | −9.132E−01 | 1.017E+00 | −6.363E−01 | 2.166E−01 | −3.091E−02 |
| 10 | 2.915E−02 | −2.383E−01 | 3.208E−01 | −3.004E−01 | 1.883E−01 | −6.677E−02 | 1.220E−02 | −1.489E−03 | 1.519E−04 |
| 11 | 3.030E−01 | −2.159E−01 | 5.303E−02 | −3.198E−03 | 1.193E−02 | −7.249E−03 | 8.246E−04 | −6.014E−04 | 3.196E−04 |
| 12 | −1.522E−01 | −3.389E−01 | 4.659E−01 | −3.406E−01 | 1.735E−01 | −5.838E−02 | 9.526E−03 | −1.027E−03 | 4.241E−04 |
| 13 | −2.822E−01 | 1.680E−01 | −6.323E−02 | 1.510E−02 | −2.597E−03 | 3.694E−04 | −3.599E−05 | −5.848E−07 | 5.073E−07 |

Figure 2:
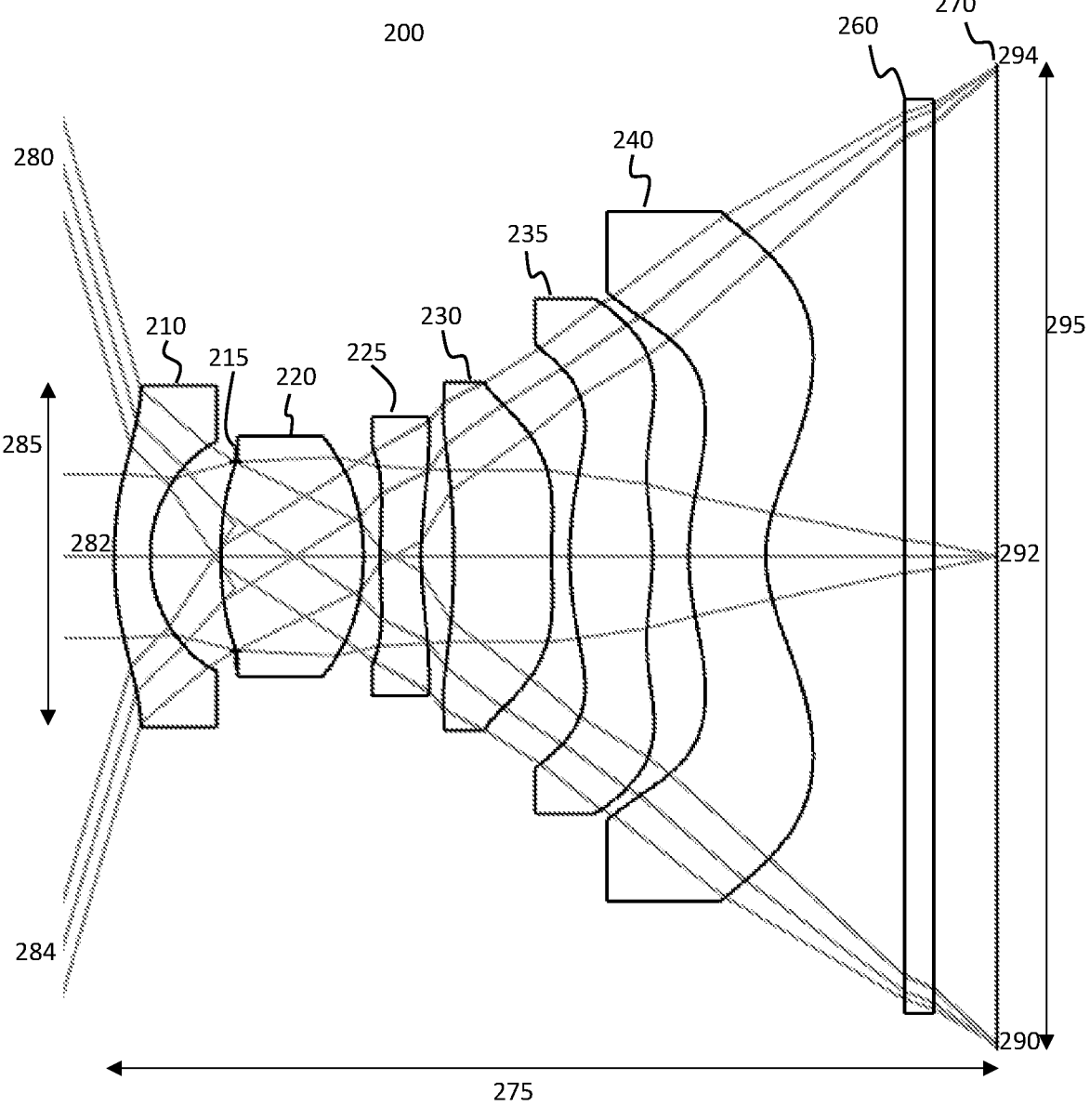
FIG. 2 shows the optical layout of a second embodiment of the miniature ultra-wide-angle lens including six optical elements.

FIG. 2 shows the optical layout of a second embodiment of the miniature ultra-wide-angle lens including six optical elements. In this second embodiment, a ray of light travelling from an object to an image plane passes successively through a first optical element 210, an aperture stop 215, a second optical element 220, a third optical element 225, a fourth optical element 230, a fifth optical element 235 and a sixth optical element 240. The light then passes through an optional coverglass and/or filter window(s) 260 before creating an image in an image plane 270. In this example embodiment, the total field of view represented as the angular separation between the incoming rays from the maximum field angle 280 and the incoming rays from the minimum field angle 284 has a value of 150°, but the total field of view could be any value between 130° and 170° according to the present invention, or more specifically between 140° and 160° in other embodiments of the present invention. In this example, the rays 280 coming from the object from an angle of +75° form an image at position 290 in the image plane, the rays 282 coming from the object from an angle of 0° form an image at position 292 in the image plane and the rays 284 coming from the object from an angle of −75° form an image at position 294 in the image plane. On the object side surface of the first optical element 210, there is a clear aperture dimension 285, which is defined as the diameter on the surface limited by the upper rays at the maximum field angle 280 and the lower rays at the minimum field angle 284. The optical lens creates an image having an image diameter 295, defined as the diameter on the image plane limited by the image location 294 for the minimum field angle and the image location 290 for the maximum field angle. The optical lens also has a total track length 275, defined as the distance on the optical axis from the vertex on the object side of the first element 210 to the image plane 270. The full optical prescription for this second embodiment is found in tables 3 and 4.

TABLE 3

Optical prescription of the second embodiment - Main parameters.

| Sur-face # | Type | Radius | Thick-ness | Index | Abbe | Conic |
|---|---|---|---|---|---|---|
| Object | STANDARD | Infinity | Infinity | | | |
| 1 | XOSPHERE | 3.188 | 0.255 | 1.535 | 56.115 | −58.946 |
| 2 | XOSPHERE | 1.212 | 0.606 | | | −6.244 |
| 3 (stop) | STANDARD | Infinity | −0.108 | | | |
| 4 | XOSPHERE | 2.736 | 1.013 | 1.535 | 56.115 | −22.932 |
| 5 | XOSPHERE | −2.050 | 0.120 | | | 1.732 |
| 6 | XOSPHERE | 4.388 | 0.289 | 1.661 | 20.354 | −43.016 |
| 7 | XOSPHERE | 2.814 | 0.232 | | | −9.343 |
| 8 | XOSPHERE | −9.074 | 0.695 | 1.535 | 56.115 | 25.019 |
| 9 | XOSPHERE | 6.644 | 0.128 | | | 6.369 |
| 10 | XOSPHERE | 2.886 | 0.590 | 1.535 | 56.115 | −30.214 |
| 11 | XOSPHERE | −2.156 | 0.258 | | | −1.221 |
| 12 | XOSPHERE | 2.224 | 0.545 | 1.640 | 23.529 | −15.253 |

TABLE 3-continued

Optical prescription of the second embodiment - Main parameters.

| Sur-face # | Type | Radius | Thick-ness | Index | Abbe | Conic |
|---|---|---|---|---|---|---|
| 13 | XOSPHERE | 1.133 | 0.983 | | | −1.410 |
| 14 | STANDARD | Infinity | 0.210 | 1.517 | 64.167 | |
| 15 | STANDARD | Infinity | 0.450 | | | |
| Image | STANDARD | Infinity | 0.000 | | | |

TABLE 4

Optical prescription of the second embodiment - Aspherical coefficients.

| # | p^4 | p^6 | p^8 | p^10 | p^12 | p^14 | p^16 | p^18 | p^20 |
|---|---|---|---|---|---|---|---|---|---|
| 1 | 2.481E−01 | −3.801E−01 | 3.563E−01 | −1.781E−01 | −1.278E−01 | 3.071E−01 | −2.352E−01 | 8.598E−02 | −1.257E−02 |
| 2 | 5.747E−01 | −5.818E−01 | 1.316E+00 | −7.001E+00 | 3.380E+01 | −9.801E+01 | 1.622E+02 | −1.425E+02 | 5.209E+01 |
| 4 | 2.292E−01 | −9.815E−01 | 8.034E+00 | −4.558E+01 | 1.641E+02 | −3.720E+02 | 5.148E+02 | −3.968E+02 | 1.305E+02 |
| 5 | −2.790E−01 | 9.532E−01 | −2.680E+00 | 5.212E+00 | −5.576E+00 | 1.147E+00 | 4.197E+00 | −4.430E+00 | 1.410E+00 |
| 6 | −4.126E−01 | 8.445E−01 | −2.482E+00 | 5.753E+00 | −9.801E+00 | 1.167E+01 | −9.172E+00 | 4.185E+00 | −8.386E−01 |
| 7 | −1.975E−01 | 3.113E−01 | −5.367E−01 | 6.975E−01 | −6.039E−01 | 3.465E−01 | −1.254E−01 | 2.053E−02 | 3.196E−05 |
| 8 | −1.516E−01 | 4.036E−01 | −5.662E−01 | 4.543E−01 | −1.374E−01 | −9.477E−02 | 1.387E−01 | −7.113E−02 | 1.368E−02 |
| 9 | −3.898E−01 | 8.598E−02 | −5.822E−02 | 4.854E−01 | −1.033E+00 | 1.120E+00 | −6.919E−01 | 2.313E−01 | −3.217E−02 |
| 10 | 1.817E−01 | −4.352E−01 | 5.348E−01 | −4.806E−01 | 2.778E−01 | −9.637E−02 | 1.811E−02 | −1.395E−03 | −1.289E−06 |
| 11 | 3.616E−01 | −7.109E−02 | −2.202E−01 | 2.426E−01 | −1.322E−01 | 4.409E−02 | −9.191E−03 | 1.110E−03 | −5.948E−05 |
| 12 | 1.026E−01 | −3.828E−01 | 4.998E−01 | −4.132E−01 | 2.233E−01 | −7.796E−02 | 1.669E−02 | −1.973E−03 | 9.789E−05 |
| 13 | −2.493E−01 | 1.410E−01 | −6.116E−02 | 1.866E−02 | −3.867E−03 | 5.162E−04 | −4.098E−05 | 1.656E−06 | −2.205E−08 |

Figure 3:
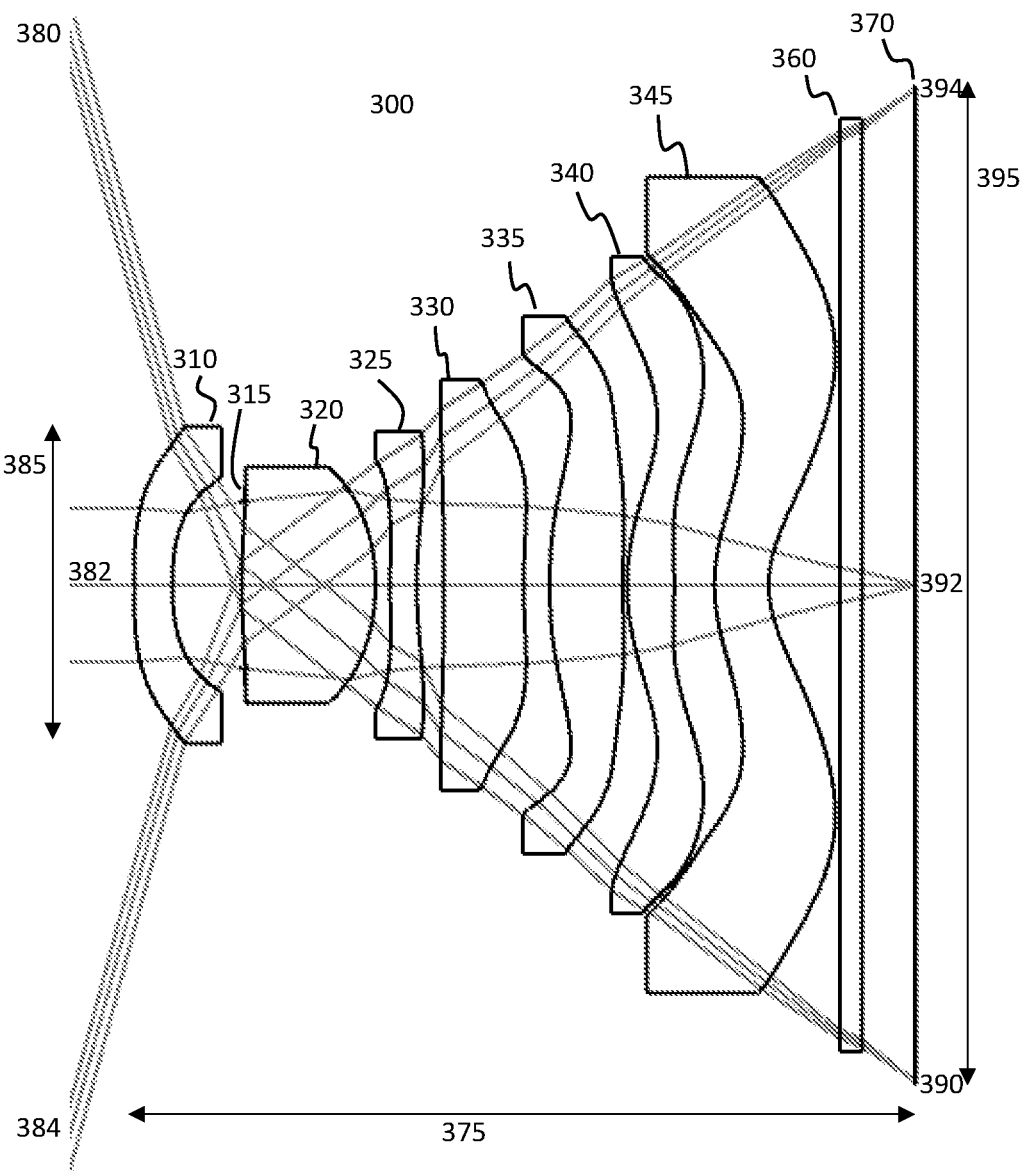
FIG. 3 shows the optical layout of a third embodiment of the miniature ultra-wide-angle lens including seven optical elements.

FIG. 3 shows the optical layout of a third embodiment of the miniature ultra-wide-angle lens including seven optical elements. In this third embodiment, a ray of light travelling from an object to an image plane passes successively through a first optical element 310, an aperture stop 315, a second optical element 320, a third optical element 325, a fourth optical element 330, a fifth optical element 335, a sixth optical element 340 and a seventh optical element 345. The light then passes through an optional coverglass and/or filter window(s) 360 before creating an image in an image plane 370. In this example embodiment, the total field of view represented as the angular separation between the incoming rays from the maximum field angle 380 and the incoming rays from the minimum field angle 384 has a value of 150°, but the total field of view could be any value between 130° and 170° according to the present invention, or more specifically between 140° and 160° in other embodiments of the present invention. In this example, the rays 380 coming from the object from an angle of +75° form an image at position 390 in the image plane, the rays 382 coming from the object from an angle of 0° form an image at position 392 in the image plane and the rays 384 coming from the object from an angle of −75° form an image at position 394 in the image plane. On the object side surface of the first optical element 310, there is a clear aperture dimension 385, which is defined as the diameter on the surface limited by the upper rays at the maximum field angle 380 and the lower rays at the minimum field angle 384. The optical lens creates an image having an image diameter 395, defined as the diameter on the image plane limited by the image location 394 for the minimum field angle and the image location 390 for the maximum field angle. The optical lens also has a total track length 375, defined as the distance on the optical axis from the vertex on the object side of the first element 310 to the image plane 370. The full optical prescription for this third embodiment is found in tables 5 and 6.

TABLE 5

Optical prescription of the third embodiment - Main parameters.

| Sur-face # | Type | Radius | Thick-ness | Index | Abbe | Conic |
|---|---|---|---|---|---|---|
| Object | STANDARD | Infinity | In-finity | | | |
| 1 | XOSPHERE | 9.727 | 0.364 | 1.545 | 55.987 | 24.550 |
| 2 | XOSPHERE | 2.734 | 0.683 | | | −29.147 |
| 3 (stop) | STANDARD | Infinity | −0.024 | | | |
| 4 | XOSPHERE | 7.767 | 1.267 | 1.545 | 55.987 | −93.649 |
| 5 | XOSPHERE | −1.966 | 0.139 | | | 1.685 |
| 6 | XOSPHERE | 13.145 | 0.252 | 1.670 | 19.400 | 98.141 |
| 7 | XOSPHERE | 4.490 | 0.251 | | | −40.863 |
| 8 | XOSPHERE | 66.029 | 0.769 | 1.545 | 55.987 | |
| 9 | XOSPHERE | 7.380 | 0.246 | | | −14.814 |
| 10 | XOSPHERE | 6.351 | 0.692 | 1.517 | 57.300 | −10.458 |
| 11 | XOSPHERE | 8.989 | 0.040 | | | 9.132 |
| 12 | XOSPHERE | 2.167 | 0.447 | 1.517 | 57.300 | −2.592 |
| 13 | XOSPHERE | −6.809 | 0.381 | | | 2.839 |
| 14 | XOSPHERE | 1.703 | 0.514 | 1.661 | 20.354 | −1.852 |
| 15 | XOSPHERE | 1.019 | 0.674 | | | −0.961 |
| 16 | STANDARD | Infinity | 0.210 | 1.517 | 64.167 | |
| 17 | STANDARD | Infinity | 0.512 | | | |
| Image | STANDARD | Infinity | 0.000 | | | |

TABLE 6

Optical prescription of the third embodiment - Aspherical coefficients.

| # | p^4 | p^6 | p^8 | p^10 | p^12 | p^14 | p^16 | p^18 | p^20 |
|---|---|---|---|---|---|---|---|---|---|
| 1 | 1.355E−01 | −6.929E−02 | 6.514E−02 | −7.285E−02 | 7.215E−02 | −5.030E−02 | 2.174E−02 | −5.314E−03 | 5.622E−04 |
| 2 | 4.382E−01 | −5.985E−01 | 1.713E+00 | −3.881E+00 | 6.603E+00 | −7.732E+00 | 5.867E+00 | −2.553E+00 | 4.655E−01 |

TABLE 6-continued

Optical prescription of the third embodiment - Aspherical coefficients.

| # | p^4 | p^6 | p^8 | p^10 | p^12 | p^14 | p^16 | p^18 | p^20 |
|---|---|---|---|---|---|---|---|---|---|
| 4 | 1.968E-02 | -2.966E-02 | 2.049E-01 | -1.435E+00 | 5.104E+00 | -1.055E+01 | 1.260E+01 | -8.163E+00 | 2.244E+00 |
| 5 | -3.418E-03 | -2.177E-01 | 1.251E+00 | -3.814E+00 | 7.190E+00 | -8.516E+00 | 6.178E+00 | -2.506E+00 | 4.365E-01 |
| 6 | -8.312E-02 | -1.277E-01 | 4.143E-01 | -7.870E-01 | 9.445E-01 | -7.297E-01 | 3.497E-01 | -9.413E-02 | 1.079E-02 |
| 7 | 2.047E-02 | -1.319E-01 | 2.237E-01 | -2.574E-01 | 2.053E-01 | -1.114E-01 | 3.914E-02 | -8.023E-03 | 7.275E-04 |
| 8 | -1.752E-02 | -4.083E-02 | 1.089E-01 | -1.229E-01 | 8.274E-02 | -3.510E-02 | 9.246E-03 | -1.386E-03 | 9.008E-05 |
| 9 | 1.119E-02 | -1.825E-01 | 2.165E-01 | -1.661E-01 | 8.790E-02 | -3.157E-02 | 7.293E-03 | -9.612E-04 | 5.411E-05 |
| 10 | 1.399E-01 | -1.780E-01 | 1.226E-01 | -5.561E-02 | 1.602E-02 | -2.592E-03 | 1.147E-04 | 2.475E-05 | -2.640E-06 |
| 11 | -1.050E-01 | 5.583E-02 | -2.994E-02 | 1.678E-02 | -6.098E-03 | 1.206E-03 | -1.204E-04 | 4.784E-06 | 3.735E-10 |
| 12 | -2.860E-02 | 2.799E-02 | -3.825E-02 | 2.015E-02 | -5.691E-03 | 9.485E-04 | -9.348E-05 | 5.039E-06 | -1.145E-07 |
| 13 | 2.142E-01 | -1.025E-02 | 2.302E-02 | -1.889E-03 | -3.426E-04 | 1.174E-04 | -1.447E-05 | 8.585E-07 | -2.021E-08 |
| 14 | -5.759E-02 | -5.290E-02 | 5.455E-02 | -2.308E-02 | 5.379E-03 | -7.392E-04 | 5.980E-05 | -2.640E-06 | 4.915E-08 |
| 15 | -2.295E-01 | 8.012E-02 | -1.995E-02 | 3.222E-03 | -3.362E-04 | 2.231E-05 | -8.963E-07 | 1.943E-08 | -1.678E-10 |

Figure 4:
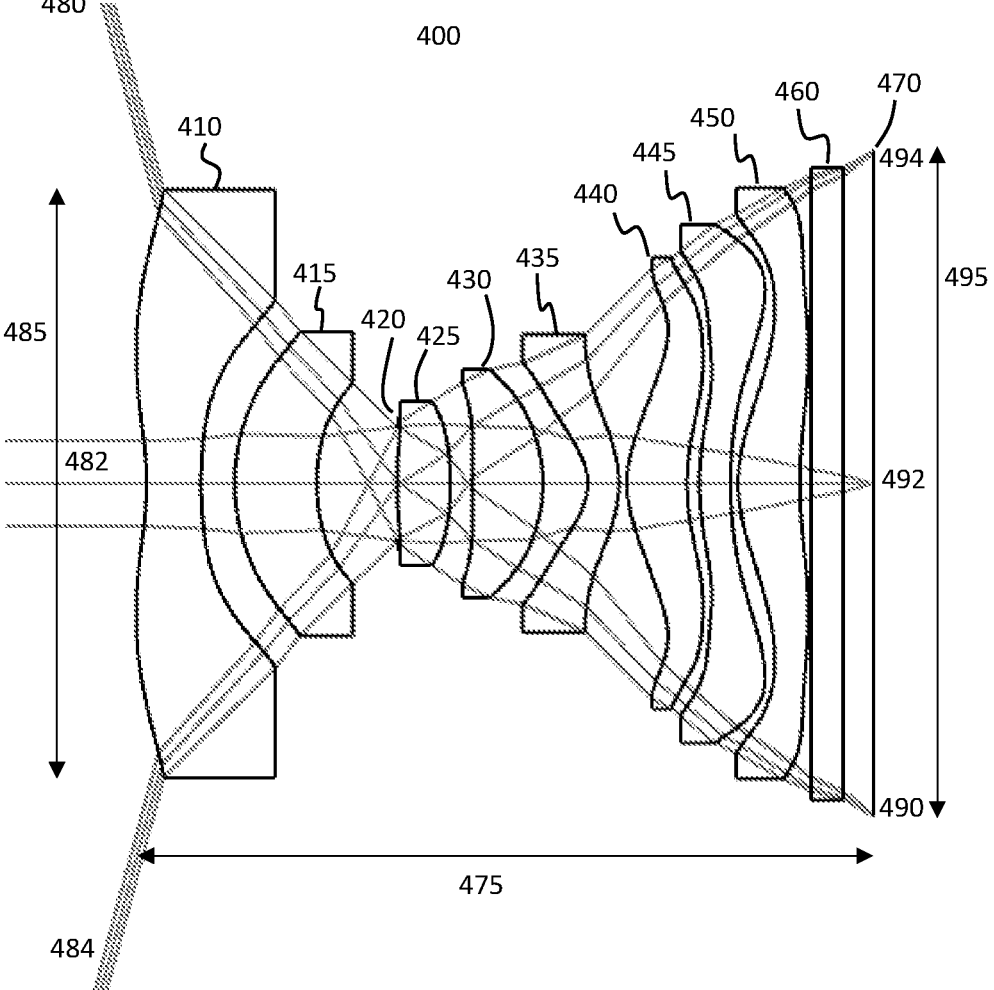
FIG. 4 shows the optical layout of a fourth embodiment of the miniature ultra-wide-angle lens including eight optical elements.

FIG. 4 shows the optical layout of a fourth embodiment of the miniature ultra-wide-angle lens including eight optical elements. In this fourth embodiment, a ray of light travelling from an object to an image plane passes successively through a first optical element 410, a second optical element 415, an aperture stop 420, a third optical element 425, a fourth optical element 430, a fifth optical element 435, a sixth optical element 440, a seventh optical element 445 and an eighth optical element 450. The light then passes through an optional coverglass and/or filter window(s) 460 before creating an image in an image plane 470. In this example embodiment, the total field of view represented as the angular separation between the incoming rays from the maximum field angle 480 and the incoming rays from the minimum field angle 484 has a value of 150°, but the total field of view could be any value between 130° and 170° according to the present invention, or more specifically between 140° and 160° in other embodiments of the present invention. In this example, the rays 480 coming from the object from an angle of +75° form an image at position 490 in the image plane, the rays 482 coming from the object from an angle of 0° form an image at position 492 in the image plane and the rays 484 coming from the object from an angle of −75° form an image at position 494 in the image plane. On the object side surface of the first optical element 410, there is a clear aperture dimension 485, which is defined as the diameter on the surface limited by the upper rays at the maximum field angle 480 and the lower rays at the minimum field angle 484. The optical lens creates an image having an image diameter 495, defined as the diameter on the image plane limited by the image location 494 for the minimum field angle and the image location 490 for the maximum field angle. The optical lens also has a total track length 475, defined as the distance on the optical axis from the vertex on the object side of the first element 410 to the image plane 470. The full optical prescription for this fourth embodiment is found in tables 7 and 8.

TABLE 7

Optical prescription of the fourth embodiment - Main parameters.

| Surface # | Type | Radius | Thickness | Index | Abbe | Conic |
|---|---|---|---|---|---|---|
| Object | STANDARD | Infinity | Infinity | | | |
| 1 | EVENASPH | -1.794 | 0.353 | 1.525 | 58.000 | -19.595 |
| 2 | EVENASPH | 3.080 | 0.216 | | | 5.019 |
| 3 | EVENASPH | 1.188 | 0.532 | 1.639 | 23.200 | -2.449 |
| 4 | EVENASPH | 1.284 | 0.524 | | | -1.993 |
| 5 (stop) | STANDARD | Infinity | -0.006 | | | |
| 6 | EVENASPH | 2.643 | 0.344 | 1.544 | 56.000 | 3.304 |
| 7 | EVENASPH | -1.922 | 0.145 | | | -61.485 |
| 8 | EVENASPH | 34.011 | 0.453 | 1.544 | 56.000 | 99.001 |
| 9 | EVENASPH | -0.955 | 0.291 | | | -1.080 |
| 10 | EVENASPH | -0.316 | 0.201 | 1.669 | 19.400 | -2.762 |
| 11 | EVENASPH | -0.743 | 0.050 | | | -0.987 |
| 12 | EVENASPH | 0.620 | 0.391 | 1.544 | 56.000 | -7.469 |
| 13 | EVENASPH | 1.602 | 0.080 | | | -0.653 |
| 14 | EVENASPH | 1.612 | 0.200 | 1.544 | 56.000 | -98.909 |
| 15 | EVENASPH | 2.416 | 0.049 | | | -99.001 |
| 16 | EVENASPH | 0.949 | 0.400 | 1.525 | 58.000 | -3.602 |
| 17 | EVENASPH | 2.742 | 0.070 | | | -0.573 |
| 18 | STANDARD | Infinity | 0.210 | 1.517 | 64.200 | |
| 19 | STANDARD | Infinity | 0.199 | | | |
| Image | STANDARD | Infinity | 0.000 | | | |

TABLE 8

Optical prescription of the fourth embodiment - Aspherical coefficients.

| # | p^4 | p^6 | p^8 | p^10 | p^12 | p^14 | p^16 | p^18 | p^20 |
|---|---|---|---|---|---|---|---|---|---|
| 1 | 1.670E-01 | -1.160E-01 | 5.425E-02 | -1.587E-02 | 2.584E-03 | -1.847E-04 | 7.314E-07 | | |
| 2 | 5.716E-02 | 5.352E-01 | -1.080E+00 | 9.973E-01 | -4.658E-01 | 8.657E-02 | -4.514E-03 | | |
| 3 | -1.379E-01 | 1.216E+00 | -2.504E+00 | 2.844E+00 | -1.732E+00 | 3.993E-01 | -1.412E-03 | | |
| 4 | 3.283E-01 | 5.756E-01 | -1.736E+00 | 3.221E+00 | -2.105E+00 | 1.828E+00 | -2.094E+00 | | |
| 6 | -2.348E-01 | -1.617E-01 | -4.177E+00 | 1.225E+01 | -3.820E+01 | 2.213E+01 | | | |
| 7 | -1.374E+00 | 4.353E+00 | -1.813E+01 | 4.067E+01 | -4.416E+01 | -3.797E+00 | | | |
| 8 | -3.395E-01 | -7.948E-01 | 2.312E+00 | -5.797E+00 | 1.233E+01 | -7.371E+00 | | | |
| 9 | 2.050E-01 | -2.723E+00 | 1.110E+01 | -2.717E+01 | 3.168E+01 | -1.327E+01 | | | |
| 10 | -2.302E-01 | 1.304E+00 | 2.780E+00 | -2.180E+01 | 4.344E+01 | -4.063E+01 | 1.562E+01 | | |
| 11 | 6.194E-01 | -1.778E-01 | 1.236E+00 | -3.652E+00 | 3.991E+00 | -1.866E+00 | 3.083E-01 | | |
| 12 | 1.775E-01 | -6.021E-01 | 1.033E+00 | -1.177E+00 | 7.085E-01 | -2.043E-01 | 2.246E-02 | | |

TABLE 8-continued

| | | | | Optical prescription of the fourth embodiment - Aspherical coefficients. | | | | |
| # | p^4 | p^6 | p^8 | p^10 | p^12 | p^14 | p^16 | p^18 | p^20 |
| --- | --- | --- | --- | --- | --- | --- | --- | --- | --- |
| 13 | 1.601E−01 | −1.915E+00 | 3.348E+00 | −2.823E+00 | 1.249E+00 | −2.773E−01 | 2.430E−02 | | |
| 14 | 8.973E−01 | −3.182E+00 | 4.459E+00 | −3.236E+00 | 1.272E+00 | −2.566E−01 | 2.072E−02 | | |
| 15 | 3.232E−01 | −2.692E−01 | −5.186E−02 | 1.925E−01 | −1.167E−01 | 2.936E−02 | −2.696E−03 | | |
| 16 | −2.087E−01 | 1.509E−01 | −1.177E−01 | 7.374E−02 | −3.022E−02 | 6.506E−03 | −5.421E−04 | | |
| 17 | −1.841E−01 | 5.675E−02 | −1.821E−02 | 2.050E−02 | −1.057E−02 | 2.205E−03 | −1.649E−04 | | |

Figure 5:
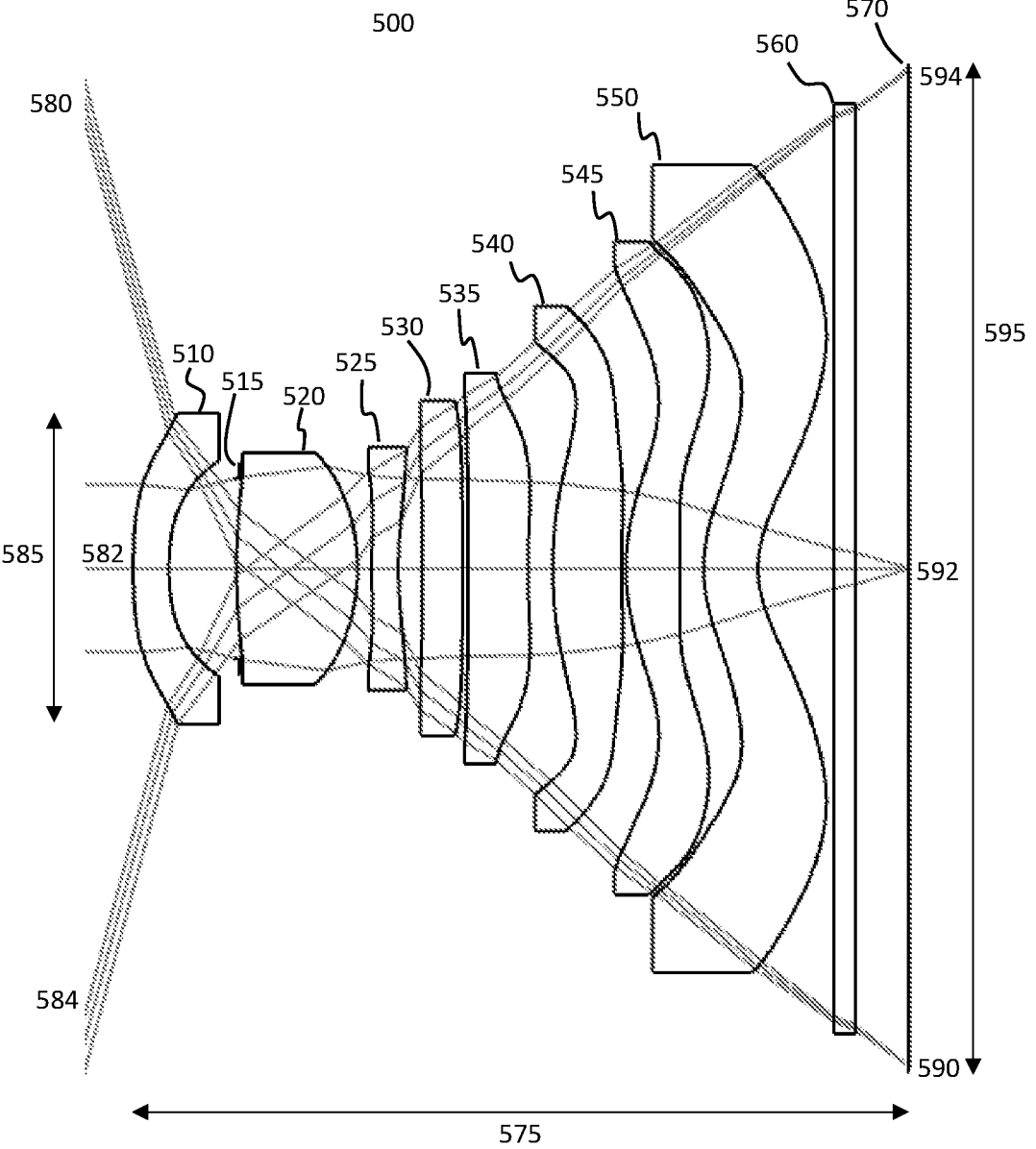
FIG. 5 shows the optical layout of a fifth embodiment of the miniature ultra-wide-angle lens including eight optical elements.

FIG. 5 shows the optical layout of a fifth embodiment of the miniature ultra-wide-angle lens including eight optical elements. In this fifth embodiment, a ray of light travelling from an object to an image plane passes successively through a first optical element 510, an aperture stop 515, a second optical element 520, a third optical element 525, a fourth optical element 530, a fifth optical element 535, a sixth optical element 540, a seventh optical element 545 and an eighth optical element 550. The light then passes through an optional coverglass and/or filter window(s) 560 before creating an image in an image plane 570. In this example embodiment, the total field of view represented as the angular separation between the incoming rays from the maximum field angle 580 and the incoming rays from the minimum field angle 584 has a value of 150°, but the total field of view could be any value between 130° and 170° according to the present invention, or more specifically between 140° and 160° in other embodiments of the present invention. In this example, the rays 580 coming from the object from an angle of +75° form an image at position 590 in the image plane, the rays 582 coming from the object from an angle of 0° form an image at position 592 in the image plane and the rays 584 coming from the object from an angle of −75° form an image at position 594 in the image plane. On the object side surface of the first optical element 510, there is a clear aperture dimension 585, which is defined as the diameter on the surface limited by the upper rays at the maximum field angle 580 and the lower rays at the minimum field angle 584. The optical lens creates an image having an image diameter 595, defined as the diameter on the image plane limited by the image location 594 for the minimum field angle and the image location 590 for the maximum field angle. The optical lens also has a total track length 575, defined as the distance on the optical axis from the vertex on the object side of the first element 510 to the image plane 570. The full optical prescription for this fifth embodiment is found in tables 9 and 10.

TABLE 9

| | | | | | | |
| --- | --- | --- | --- | --- | --- | --- |
| | | Optical prescription of the fifth embodiment - Main parameters. | | | | |
| Sur-face # | Type | Radius | Thick-ness | Index | Abbe | Conic |
| Object | STANDARD | Infinity | In-finity | | | |
| 1 | XOSPHERE | 7.006 | 0.339 | 1.545 | 55.987 | 13.183 |
| 2 | XOSPHERE | 2.382 | 0.663 | | | −27.105 |
| 3 (stop) | STANDARD | Infinity | −0.019 | | | |
| 4 | XOSPHERE | 6.909 | 1.146 | 1.545 | 55.987 | −19.112 |
| 5 | XOSPHERE | −1.960 | 0.138 | | | 1.719 |
| 6 | XOSPHERE | 13.150 | 0.252 | 1.670 | 19.400 | 97.973 |
| 7 | XOSPHERE | 3.894 | 0.228 | | | −50.601 |
| 8 | XOSPHERE | −79.311 | 0.381 | 1.545 | 55.987 | |
| 9 | XOSPHERE | −432.667 | 0.050 | | | |
| 10 | XOSPHERE | −83.853 | 0.573 | 1.545 | 55.987 | |
| 11 | XOSPHERE | 8.992 | 0.238 | | | −1.409 |
| 12 | XOSPHERE | 6.310 | 0.650 | 1.517 | 57.300 | −1.794 |
| 13 | XOSPHERE | 8.361 | 0.040 | | | 8.300 |
| 14 | XOSPHERE | 2.072 | 0.518 | 1.517 | 57.300 | −2.307 |
| 15 | XOSPHERE | −6.634 | 0.223 | | | 2.771 |
| 16 | XOSPHERE | 1.487 | 0.515 | 1.661 | 20.354 | −1.657 |
| 17 | XOSPHERE | 1.015 | 0.720 | | | −0.957 |
| 18 | STANDARD | Infinity | 0.210 | 1.517 | 64.167 | |
| 19 | STANDARD | Infinity | 0.521 | | | |
| Image | STANDARD | Infinity | 0.000 | | | |

TABLE 10

| | | | | Optical prescription of the fifth embodiment - Aspherical coefficients. | | | | | |
| # | p^4 | p^6 | p^8 | p^10 | p^12 | p^14 | p^16 | p^18 | p^20 |
| --- | --- | --- | --- | --- | --- | --- | --- | --- | --- |
| 1 | 1.307E−01 | −6.751E−02 | 6.150E−02 | −7.399E−02 | 7.208E−02 | −5.022E−02 | 2.178E−02 | −5.304E−03 | 5.611E−04 |
| 2 | 4.823E−01 | −6.474E−01 | 1.710E+00 | −3.860E+00 | 6.601E+00 | −7.753E+00 | 5.846E+00 | −2.556E+00 | 4.909E−01 |
| 4 | 1.523E−02 | −2.909E−02 | 2.137E−01 | −1.430E+00 | 5.103E+00 | −1.055E+01 | 1.261E+01 | −8.142E+00 | 2.200E+00 |
| 5 | 2.380E−02 | −2.236E−01 | 1.252E+00 | −3.812E+00 | 7.189E+00 | −8.517E+00 | 6.177E+00 | −2.506E+00 | 4.373E−01 |
| 6 | −8.234E−02 | −1.183E−01 | 4.147E−01 | −7.887E−01 | 9.435E−01 | −7.300E−01 | 3.497E−01 | −9.413E−02 | 1.081E−02 |
| 7 | 2.399E−02 | −1.306E−01 | 2.239E−01 | −2.575E−01 | 2.052E−01 | −1.114E−01 | 3.912E−02 | −8.026E−03 | 7.278E−04 |
| 8 | −1.253E−02 | −3.991E−02 | 1.090E−01 | −1.228E−01 | 8.275E−02 | −3.511E−02 | 9.241E−03 | −1.388E−03 | 8.974E−05 |
| 9 | −8.608E−03 | 1.599E−04 | 8.432E−05 | −1.195E−04 | −5.061E−05 | −8.090E−06 | 1.973E−06 | 1.932E−06 | 0.000E+00 |
| 10 | 2.637E−03 | −1.255E−03 | −3.335E−04 | 1.238E−05 | 2.327E−05 | 5.369E−06 | −2.929E−07 | −7.316E−07 | 0.000E+00 |
| 11 | 1.461E−02 | −1.823E−01 | 2.166E−01 | −1.660E−01 | 8.790E−02 | −3.157E−02 | 7.293E−03 | −9.612E−04 | 5.413E−05 |
| 12 | 1.398E−01 | −1.784E−01 | 1.226E−01 | −5.560E−02 | 1.603E−02 | −2.592E−03 | 1.147E−04 | 2.474E−05 | −2.643E−06 |
| 13 | −1.044E−01 | 5.571E−02 | −2.994E−02 | 1.678E−02 | −6.098E−03 | 1.206E−03 | −1.204E−04 | 4.782E−06 | −5.772E−11 |
| 14 | −2.896E−02 | 2.797E−02 | −3.825E−02 | 2.015E−02 | −5.691E−03 | 9.485E−04 | −9.348E−05 | 5.039E−06 | −1.145E−07 |
| 15 | 2.142E−01 | −1.025E−01 | 2.302E−02 | −1.889E−03 | −3.426E−04 | 1.174E−04 | −1.447E−05 | 8.585E−07 | −2.022E−08 |
| 16 | −5.756E−02 | −5.300E−02 | 5.455E−02 | −2.308E−02 | 5.379E−03 | −7.392E−04 | 5.980E−05 | −2.640E−06 | 4.915E−08 |
| 17 | −2.298E−01 | 8.012E−02 | −1.995E−02 | 3.222E−03 | −3.362E−04 | 2.231E−05 | −8.963E−07 | 1.943E−08 | −1.678E−10 |

FIGS. 1 to 5 show the optical layout of five embodiments of a miniature ultra-wide angle optical lens according to the present invention. Table 11 gives, for all these example embodiments, the total track length (TTL), the image diameter, the L1 clear aperture diameter the f/# and the focal length of the complete system. Table 12 gives, for all these example embodiments, the focal length in the paraxial region of each individual optical element, denoted as f[n] where n is the element number from the object to the image side. Table 13 gives, for all these example embodiments, some relevant ratios that need to be respected to have optimal lenses according to the present invention.

TABLE 11

| Selected optical parameters. | | | | | |
|---|---|---|---|---|---|
| Embodiment # | TTL [mm] | Image diameter [mm] | L1 clear aperture [mm] | f/# [—] | Focal length [mm] |
| 1 | 5.237 | 4.566 | 2.550 | 2.0 | 1.701 |
| 2 | 6.263 | 7.500 | 2.620 | 1.9 | 2.948 |
| 3 | 7.418 | 9.400 | 3.000 | 2.1 | 2.995 |
| 4 | 4.701 | 4.300 | 3.030 | 1.8 | 0.996 |
| 5 | 7.377 | 9.464 | 2.860 | 1.7 | 2.885 |

TABLE 12

| Focal length in the paraxial region of each individual optical elements. | | | | | | | |
|---|---|---|---|---|---|---|---|
| Embodiment # | f1 [mm] | f2 [mm] | f3 [mm] | f4 [mm] | f5 [mm] | f6 [mm] | f7 [mm] | f8 [mm] |
| 1 | −2.171 | 1.960 | −4.797 | 14.030 | 1.548 | −2.362 | N/A | N/A |
| 2 | −3.814 | 2.357 | −12.687 | −7.035 | 2.397 | −4.459 | N/A | N/A |
| 3 | −7.092 | 3.011 | −10.203 | −15.280 | 38.293 | 3.224 | −5.441 | N/A |
| 4 | −2.100 | 7.794 | 2.094 | 1.709 | −1.006 | 1.623 | 8.158 | 2.558 |
| 5 | −6.782 | 2.929 | −8.271 | −177.841 | −14.834 | 44.737 | 3.107 | −8.518 |

TABLE 13

| Relevant dimensionless ratios. | | | | | |
|---|---|---|---|---|---|
| Embodiment # | Image diameter/ TTL | Image diameter/ L1 clear aperture | Image diameter/ focal length | Image diameter/ f1 | TTL/ focal length |
| 1 | 0.872 | 1.791 | 2.684 | −2.103 | 3.079 |
| 2 | 1.198 | 2.863 | 2.544 | −1.966 | 2.124 |
| 3 | 1.267 | 3.133 | 3.138 | −1.325 | 2.477 |
| 4 | 0.915 | 1.419 | 4.317 | −2.048 | 4.719 |
| 5 | 1.283 | 3.309 | 3.280 | −1.395 | 2.557 |

In order to obtain a miniature optical lens with ultra-wide field of view while still maximizing the optical performance like optimal image quality, ideal distortion profile for an ultra-wide-angle optical lens, and relative illumination, the relevant dimensionless ratios for all embodiments respect the following equations:

$$0.85 < \text{Image diameter/TTL} < 1.3 \quad (1)$$

$$1.4 < \text{Image diameter}/L1\ \text{clear aperture} < 3.4 \quad (2)$$

$$2.5 < \text{Image diameter/focal length} < 4.5 \quad (3)$$

$$-2.2 < \text{Image diameter}/f1 < -1.3 \quad (4)$$

$$2.1 < \text{TTL/focal length} < 4.8 \quad (5)$$

In all embodiments according to the present invention, the optical imaging system includes a plurality of optical elements arranged in succession from the object side to the image side of the optical system. The optical system includes at least a first optical element, a second optical element and a last optical element, but generally the plurality of optical elements may include six, seven, or eight optical elements having an optical power (excluding filters and windows). The plurality of optical elements is configured to form an optical image having an image diameter in an image plane, the optical system having a field of view between 130° and 170° and following at least one of the equations (1) to (5). In some embodiments, all five of equations (1) to (5) are satisfied at the same time by the optical system. In some other embodiments, the field of view of the optical system is between 140° and 160°.

In certain embodiments, in order to capture the rays of light from an ultra-wide field of view and condense them quickly in a single aperture stop before separating the rays again to form a large optical image having a diameter that is bigger than the clear aperture on the object side surface of the first optical element, the first optical element has a negative optical power in a central paraxial region and the second optical element has a positive optical power in a central paraxial region. Furthermore, in some embodiments, the image side surface of the first optical element is of generally concave shape.

In certain embodiments, the last optical element of the plurality of optical elements before the image plane (and optional coverglass) is of a particular shape in order to control the optical distortion and balance the image quality over the whole optical image. For the miniature ultra-wide-angle optical lenses in some embodiments, the last optical element of the plurality of optical elements before the image plane may have a convex shape in a central paraxial region surrounded by a concave shape around the central convex shape on an object side. In some other embodiments, for the last element of the plurality of optical elements before the image plane, there is a concave shape in the central paraxial region surrounded by a convex shape around the central concave shape on an image side. This specific element shape is required in order to have a small TTL and large image diameter required for the miniature optical lens as well as an ultra-wide-angle field of view.

Embodiments of optical lenses have been described herein as having an ultra-wide field of view of 150°, but the presented optical constructions could well be used with fields of view between 130° and 170° with only minimal changes. The total field of view of the optical lenses presented here could also be further limited to a field of view between 140° and 160° while respecting the above requirements and would still be understood as a miniature ultra-wide-angle lens according to the present invention.

In embodiments according to the present invention, the optical lenses can include six, seven or eight optical elements. This plurality of optical elements are generally refractive aspherical optical elements made of plastic material, but in other embodiments according to the present invention, the shape of at least one optical element could be anything, including cylindrical, spherical, conic or freeform, the material could be anything including glass, crystal or any other material able to redirect the rays of light in order to help to form an optical image in the image plane. The optical system could also include a diffractive or a metalens surface in order to improve the optical performance like the image quality, the distortion, the relative illumination, the lateral color, or any other optical performance criterion. In some other embodiments, the lens could also include a reflective element or a semi-reflective and semi-transmissive optical element like a beam splitter.

In some embodiments according to the present invention, an image sensor is located at the image plane, the image sensor being configured to convert the optical image into a digital image. This digital image file is configured to be processed by an algorithm. This algorithm is executed by any device able to execute hardware of software processing algorithm.

The optical imaging system according to the present invention can be designed according to a method as follows. The method for designing an optical imaging system includes providing a plurality of optical elements configured to form an optical image having an image diameter in an image plane, the optical system having a field of view between 130° and 170° and following at least one of the equations (1) to (5). In some embodiments, all five equations (1) to (5) are satisfied at the same time by the optical system designed according to the present method.

All of the above are figures and examples show embodiments of the miniature optical lens having an ultra-wide angle total field of view. These examples are not intended to be an exhaustive list or to limit the scope and spirit of the present invention. It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. An optical imaging system comprising a plurality of optical elements configured to form an optical image having an image diameter in an image plane, the optical system having a field of view between 140° and 160° and the following characteristics:
   a. a ratio of the image diameter divided by a total track length of the optical system is between 0.85 and 1.3,
   b. a ratio of the image diameter divided by a clear aperture diameter of a first optical element of the plurality of optical elements is between 1.4 and 3.4,
   c. a ratio of the image diameter divided by a focal length of the optical system is between 2.5 and 4.5,
   d. a ratio of the image diameter divided by a focal length of the first optical element is between −2.2 and −1.3, and
   e. a ratio of the total track length of the optical system divided by the focal length of the optical system is between 2.1 and 4.8.

2. The optical system of claim 1, wherein the plurality of optical elements comprises one of six, seven, or eight optical elements.

3. The optical system of claim 1, wherein an image side surface of the first optical element is of concave shape.

4. The optical system of claim 1, wherein a second optical element of the plurality of optical elements has a positive optical power in a central paraxial region.

5. The optical system of claim 1, wherein a last optical element of the plurality of optical elements before the image plane has a convex shape in a central paraxial region surrounded by a concave shape around the central convex shape on an object side thereof.

6. The optical system of claim 1, wherein a last optical element of the plurality of optical elements before the image plane has a concave shape in the central paraxial region surrounded by a convex shape around the central concave shape on an image side thereof.

7. The optical system of claim 1, wherein the plurality of optical elements are refractive aspherical elements made of plastic material.

8. The optical system of claim 1, wherein an image sensor is located at the image plane, the image sensor being configured to convert the optical image into a digital image.

9. The optical system of claim 8, wherein the digital image is configured to be processed by an algorithm.

10. A method for designing an optical imaging system, the method comprising providing a plurality of optical elements configured to form an optical image having an image diameter in an image plane, the optical system having a field of view between 140° and 160° and the following characteristics:
   a. a ratio of the image diameter divided by a total track length of the optical system is between 0.85 and 1.3,
   b. a ratio of the image diameter divided by a clear aperture diameter of a first optical element of the plurality of optical elements is between 1.4 and 3.4,
   c. a ratio of the image diameter divided by a focal length of the optical system is between 2.5 and 4.5,
   d. a ratio of the image diameter divided by a focal length of the first optical element is between −2.2 and −1.3, and
   e. a ratio of the total track length of the optical system divided by the focal length of the optical system is between 2.1 and 4.8.

11. The method of claim 10, wherein the plurality of optical elements comprises one of six, seven, or eight optical elements.

12. The method of claim 10, wherein an image side surface of the first optical element is of concave shape.

13. The method of claim 10, wherein a second optical element of the plurality of optical elements has a positive optical power in a central paraxial region.

14. The method of claim 10, wherein a last optical element of the plurality of optical elements before the image plane has a convex shape in a central paraxial region surrounded by a concave shape around the central convex shape on an object side thereof.

15. The method of claim 10, wherein a last optical element of the plurality of optical elements before the image plane has a concave shape in the central paraxial region surrounded by a convex shape around the central concave shape on an image side thereof.

16. The method of claim 10, wherein the plurality of optical elements are refractive aspherical elements made of plastic material.

17. The method of claim 10, further comprising locating an image sensor at the image plane, the image sensor being configured to convert the optical image into a digital image.

18. The method of claim 17, wherein the digital image is configured to be processed by an algorithm.

19. An optical imaging system comprising a plurality of optical elements having an optical power and configured to form an optical image having an image diameter in an image plane, the optical system having a field of view between 130° and 170° and the following characteristics:

a. a ratio of the image diameter divided by a total track length of the optical system is between 0.85 and 1.3, b. a ratio of the image diameter divided by a clear aperture diameter of a first optical element of the plurality of optical elements is between 1.4 and 3.4, c. a ratio of the image diameter divided by a focal length of the optical system is between 2.5 and 4.5, d. a ratio of the image diameter divided by a focal length of the first optical element is between −2.2 and −1.3, and e. a ratio of the total track length of the optical system divided by the focal length of the optical system is between 2.1 and 4.8, wherein the plurality of optical elements comprises seven or eight optical elements having an optical power.

* * * * *